United States Patent
Oguchi et al.

(10) Patent No.: US 9,765,221 B2
(45) Date of Patent: Sep. 19, 2017

(54) ORANGE INK COMPOSITION, INK SET, METHOD OF MANUFACTURING DYED PRODUCT, AND DYED PRODUCT

(71) Applicant: Seiko Epson Corporation, Tokyo (JP)

(72) Inventors: Hideki Oguchi, Fujimi (JP); Takeshi Yano, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/221,786

(22) Filed: Jul. 28, 2016

(65) Prior Publication Data

US 2017/0037249 A1    Feb. 9, 2017

(30) Foreign Application Priority Data

Aug. 6, 2015 (JP) ................. 2015-156414

(51) Int. Cl.
| | | |
|---|---|---|
| *C09D 11/40* | (2014.01) | |
| *C09D 11/328* | (2014.01) | |
| *C09B 55/00* | (2006.01) | |
| *D06P 1/13* | (2006.01) | |
| *D06P 1/16* | (2006.01) | |
| *D06P 5/28* | (2006.01) | |

(52) U.S. Cl.
CPC .......... *C09B 55/009* (2013.01); *C09D 11/328* (2013.01); *C09D 11/40* (2013.01); *D06P 1/16* (2013.01); *D06P 5/006* (2013.01)

(58) Field of Classification Search
CPC ..... C09D 11/328; C09D 11/40; C09B 55/009; D06P 1/13; D06P 1/16; D06P 5/006
USPC ...................................... 106/31.47
See application file for complete search history.

(56) References Cited

U.S. PATENT DOCUMENTS

| | | | | |
|---|---|---|---|---|
| 5,092,907 A | * | 3/1992 | Riblet ................. | C09B 67/0069 106/31.67 |
| 5,830,931 A | * | 11/1998 | Pelster .................... | C09B 57/12 524/89 |
| 6,994,736 B2 | * | 2/2006 | Sieber ....................... | D06P 1/16 8/506 |
| 9,534,128 B2 | * | 1/2017 | Oguchi .................. | C09D 11/40 |
| 2004/0168609 A1 | * | 9/2004 | Freyberg ............... | C09D 11/326 106/31.58 |
| 2005/0004259 A1 | * | 1/2005 | Freyberg ............... | C09D 11/328 523/160 |
| 2008/0193648 A1 | * | 8/2008 | Becker ................... | C09D 11/30 106/31.13 |
| 2011/0292114 A1 | * | 12/2011 | Sao ....................... | C09D 11/328 106/31.58 |

(Continued)

FOREIGN PATENT DOCUMENTS

| | | |
|---|---|---|
| EP | 1362139 A1 | 11/2003 |
| JP | 2011/021133 * | 2/2011 |

(Continued)

OTHER PUBLICATIONS

English translation of JP 2011/021133, Feb. 2011; 21 pages.*

(Continued)

*Primary Examiner* — Helene Klemanski
(74) *Attorney, Agent, or Firm* — Harness, Dickey & Pierce, P.L.C.

(57) ABSTRACT

Provided is an orange ink composition for a sublimation transfer, which contains an aromatic compound having a specific structure.

9 Claims, 1 Drawing Sheet

(56) References Cited

U.S. PATENT DOCUMENTS

| | | | |
|---|---|---|---|
| 2015/0116418 A1* | 4/2015 | Oura .................... | C09D 11/328 347/20 |
| 2015/0337152 A1* | 11/2015 | Oguchi ................ | C09D 11/40 106/31.47 |
| 2015/0337153 A1* | 11/2015 | Oguchi ................ | C09D 11/40 106/31.44 |
| 2016/0208119 A1* | 7/2016 | Oguchi ............... | C09D 11/328 |
| 2016/0208435 A1* | 7/2016 | Oguchi ................ | C09D 11/40 |

FOREIGN PATENT DOCUMENTS

| | | |
|---|---|---|
| JP | 2011-174007 A | 9/2011 |
| JP | 2015-059197 A | 3/2015 |
| WO | WO-02-057536 A1 | 7/2002 |

OTHER PUBLICATIONS

Solvent Orange 60 dye structure; http://www.worlddyevariety.com/solvent-dyes/solvent-orange-60.html; no date available; 6 pages.*
Extended European Search Report for Application No. EP 16 18 3031 dated Dec. 22, 2016 (6 pages).

* cited by examiner

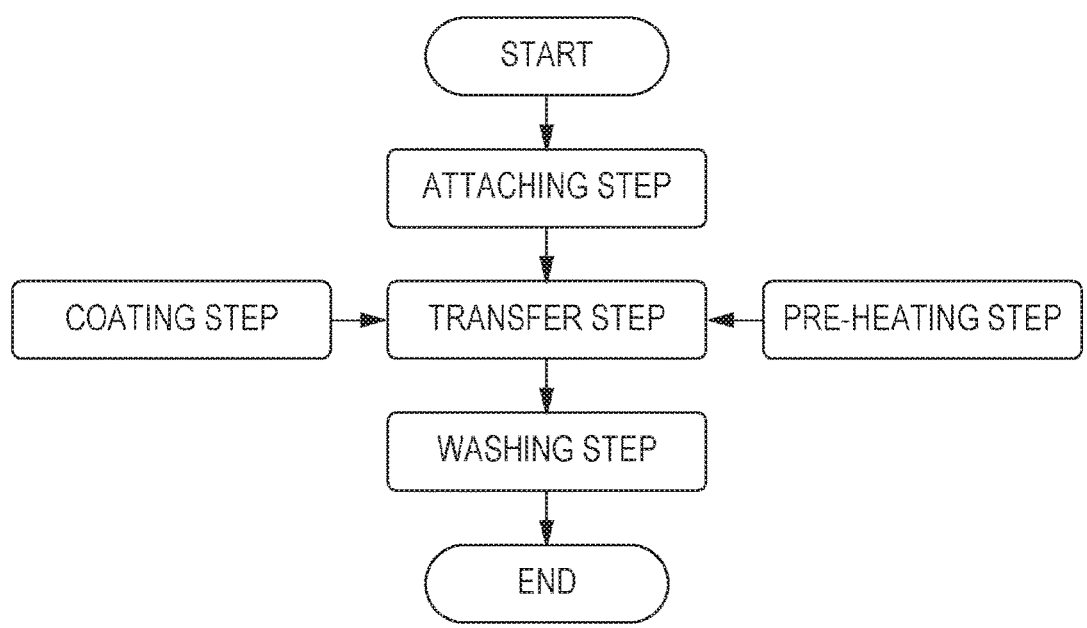

ORANGE INK COMPOSITION, INK SET, METHOD OF MANUFACTURING DYED PRODUCT, AND DYED PRODUCT

BACKGROUND

1. Technical Field

The present invention relates to an orange ink composition, an ink set, a method of manufacturing a dyed product, and a dyed product.

2. Related Art

Since an ink jet recording method is performed by using a relatively simple device and makes a high definition image possible, it has achieved rapid development in various fields. Various studies have been made to obtain a recorded material which is further stable and has high image quality.

For example, JP-A-2011-174007 discloses ink for ink jet textile printing which contains a disperse dye, a dispersant, water and a water-soluble organic solvent, and acetylene diol and acetylene glycol, and preferably, ink for inkjet textile printing in which the acetylene diol and the acetylene glycol respectively have a specific structure in order to provide ink for inkjet textile printing excellent in continuous discharge reliability in an ink jet drawing, excellent in recovery from nozzle clogging, and having little uneven dyeing in a textile-printed image, and an inkjet textile printing method.

The ink composition disclosed in JP-A-2011-174007 is used for inkjet textile printing, and is an ink composition which is suitable for performing direct printing on a material to be printed such as a polyester fiber by using the ink jet method, but is not an ink composition suitable for an ink composition for a sublimation transfer which requires at least the transferability. In addition, in a case where an orange ink composition for a sublimation transfer in the related art is used, it is difficult to obtain excellent printing stability due to gas generated from a disperse dye.

SUMMARY

An advantage of some aspects of the invention is to provide an orange ink composition for a sublimation transfer having a small gas generation amount, an ink set, a method of manufacturing a dyed product, and a dyed product.

The present inventors have intensively studied in order to solve the above problems. As a result, it has been found that the gas generation amount can be reduced by using an orange ink composition containing a compound having a predetermined structure for a sublimation transfer, and therefore, the invention is completed.

That is, the invention is configured as follows.

[1] A sublimation transfer orange ink composition contains a compound expressed by the following Formula (1).

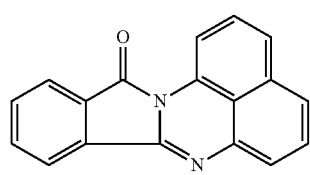

(1)

[2] The orange ink composition according to the above-described [1], contains the compound expressed by Formula (1) in a range of 1.0 mass % to 7.0 mass %, with respect to the total amount of the orange ink composition.

[3] An ink set contains the orange ink composition according to the above-described [1] or [2], a yellow ink composition, a magenta ink composition, and a cyan ink composition, in which the yellow ink composition, the magenta ink composition, and the cyan ink composition each independently contain a disperse dye.

[4] The ink set according to the above-described [3], further contains a blue ink composition containing a disperse dye.

[5] In the ink set according to the above-described [3] or [4], the disperse dye in the yellow ink composition is a C.I. disperse yellow 54, the disperse dye in the magenta ink composition is a C.I. disperse red 60, and the disperse dye in the cyan ink composition is a C.I. disperse blue 359.

[6] In the ink set according to any one of the above-described [3] to [5], the disperse dye in the blue ink composition is a C.I. disperse blue 72, or a C.I. disperse violet 28.

[7] A method of manufacturing a dyed product includes a step of attaching an orange ink composition according to any one of at least the above-described [1] and [2] to an intermediate transfer medium, by using an ink jet method, and a step of transferring a compound expressed by the following Formula (1) in the orange ink composition to a recording medium by heating the compound in a state where a surface onto which the orange ink composition of the intermediate transfer medium is attached and a dyed surface of the recording medium face each other.

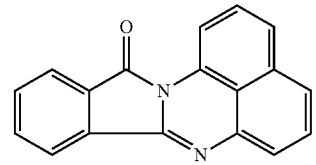

(1)

[8] A dyed product is obtained by using the method of manufacturing a dyed product according to the above-described [7].

BRIEF DESCRIPTION OF THE DRAWING

The invention will be described with reference to the accompanying drawing, wherein like numbers reference like elements.

FIGURE is a flow chart illustrating an example of steps included in a method of manufacturing a dyed product of the present embodiment.

DESCRIPTION OF EXEMPLARY EMBODIMENTS

Hereinafter, the embodiment of the invention (hereinafter, referred to as "the embodiment") will be described in detail. The following embodiments are examples for describing the invention, and the invention is not limited to the following contents. The invention can be variously modified within a scope which does not depart from the gist thereof.

Orange Ink Composition

The orange ink composition of the embodiment is for a sublimation transfer, and contains a compound (hereinafter, also referred to as a "specific disperse dye") expressed by the following Formula (1). In addition, as necessary, the orange ink composition contains at least one or two or more types of compounds selected from the group consisting of water and a water-soluble organic solvent.

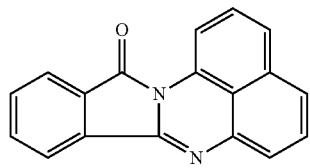

(1)

Ink Set

The ink set of the embodiment includes the orange ink composition, a yellow ink composition, a magenta ink composition, and a cyan ink composition, in which the yellow ink composition, the magenta ink composition, and the cyan ink composition each independently contain a disperse dye. When such an ink set is used for the sublimation transfer, the color reproducibility becomes excellent. The factor for this is assumed to be that the color reproduction area is wide in the ink set of the embodiment containing the orange ink of the embodiment, and thus the color reproducibility becomes excellent as compared with the ink set in the related art (here, the factor is not limited thereto).

It is preferable that the ink set further includes a blue ink composition containing the disperse dye. With this, the color reproducibility further becomes excellent by the ink set. Hereinafter, in a case where there is no need to divide the ink compositions into each color ink composition, it is simply referred to as an "ink composition".

Disperse Dye

The orange ink composition of the embodiment contains at least the above-described specific disperse dye as a disperse dye, but may further contain other disperse dyes. When the specific disperse dye is contained the orange ink composition, the gas generation amount can be reduced in a case where the orange ink composition is used for the sublimation transfer. The factor for this is assumed to be as follows (here, the factor is not limited thereto). In the orange ink composition of the related art, since a disperse dye having a structure in which the ink composition exhibits an orange color is a disperse dye which relatively has decomposing properties, for example, a disperse dye having an azo structure, a portion thereof is decomposed in the ink composition and gas is generated, and thus it is difficult to obtain excellent printing stability. On the other hand, in the orange ink composition of the embodiment, a specific disperse dye having a structure in which the ink composition exhibits an orange color is an aromatic compound having the stability which is not enough for the decomposition, and thus it is less likely that the gas is generated in the ink composition. Accordingly, it is possible to obtain excellent printing stability.

The content of the specific disperse dye is preferably in a range of 0.5 mass % to 10.0 mass %, is further preferably in a range of 2.0 mass % to 7.0 mass %, and still further preferably in a range of 4.0 mass % to 7.0 mass %, with respect to the total amount (100 mass %) of the orange ink composition. When the content of the specific disperse dye is set to be equal to or greater than the lower limit value, the orange ink composition can efficiently and reliably exhibit the effects resulting from the invention, and when the content of the specific disperse dye is set to be equal to or less than the upper limit value, it is possible to realize more excellent dispersibility of the specific disperse dye in the orange ink composition.

In addition, examples of other disperse dyes which can be included in each of the ink compositions in the ink set of the embodiment include the following dyes.

The orange disperse dye is not particularly limited, and examples thereof include C.I. disperse oranges 1, 3, 5, 7, 11, 13, 17, 20, 21, 25, 29, 30, 31, 32, 33, 37, 38, 42, 43, 44, 45, 46, 47, 48, 49, 50, 53, 54, 55, 56, 57, 58, 59, 61, 66, 71, 73, 76, 78, 80, 89, 90, 91, 93, 96, 97, 119, 127, 130, 139, and 142.

The violet disperse dye is not particularly limited, and examples thereof include C.I. disperse violets 1, 4, 8, 23, 26, 27, 28, 31, 33, 35, 36, 38, 40, 43, 46, 48, 50, 51, 52, 56, 57, 59, 61, 63, 69, and 77.

The blue disperse dye is not particularly limited, and examples thereof include C.I. disperse blues 3, 7, 9, 14, 16, 19, 20, 26, 27, 35, 43, 44, 54, 55, 56, 58, 60, 62, 64, 71, 72, 73, 75, 79, 81, 82, 83, 87, 91, 93, 94, 95, 96, 102, 106, 108, 112, 113, 115, 118, 120, 122, 125, 128, 130, 134, 139, 141, 142, 143, 146, 148, 149, 153, 154, 158, 165, 167, 171, 173, 174, 176, 181, 183, 185, 186, 187, 189, 197, 198, 200, 201, 205, 207, 211, 214, 224, 225, 257, 259, 266, 267, 268, 270, 284, 285, 287, 288, 291, 293, 295, 297, 301, 315, 330, 333, 359, and 360.

The yellow disperse dye is not particularly limited, and examples thereof include C.I. disperse yellows 3, 4, 5, 7, 9, 13, 23, 24, 30, 33, 34, 42, 44, 49, 50, 51, 54, 56, 58, 60, 63, 64, 66, 68, 71, 74, 76, 79, 82, 83, 85, 86, 88, 90, 91, 93, 98, 99, 100, 104, 108, 114, 116, 118, 119, 122, 124, 126, 135, 140, 141, 149, 160, 162, 163, 164, 165, 179, 180, 182, 183, 184, 186, 192, 198, 199, 202, 204, 210, 211, 215, 216, 218, 224, 227, 231, and 232.

The red disperse dye is not particularly limited, and examples thereof include C.I. disperse reds 1, 4, 5, 7, 11, 12, 13, 15, 17, 27, 43, 44, 50, 52, 53, 54, 55, 56, 58, 59, 60, 65, 72, 73, 74, 75, 76, 78, 81, 82, 86, 88, 90, 91, 92, 93, 96, 103, 105, 106, 107, 108, 110, 111, 113, 117, 118, 121, 122, 126, 127, 128, 131, 132, 134, 135, 137, 143, 145, 146, 151, 152, 153, 154, 157, 159, 164, 167, 169, 177, 179, 181, 183, 184, 185, 188, 189, 190, 191, 192, 200, 201, 202, 203, 205, 206, 207, 210, 221, 224, 225, 227, 229, 239, 240, 257, 258, 266, 277, 278, 279, 281, 288, 298, 302, 303, 310, 311, 312, 320, 324, and 328.

The green disperse dye is not particularly limited, and examples thereof include C.I. disperse green 9.

The brown disperse dye is not particularly limited, and examples thereof include C.I. disperse browns 1, 2, 4, 9, 13, 19, and 27.

The black disperse dye is not particularly limited, and examples thereof include C.I. disperse blacks 1, 3, 10, and 24.

In the ink set of the embodiment, from the viewpoint of color reproducibility, the disperse dye in the yellow ink composition is preferably the C.I. disperse yellow 54. In addition, from the same viewpoint, the disperse dye in the magenta ink composition is preferably the C.I. disperse red 60, and the disperse dye in the cyan ink composition is preferably C.I. disperse blue 359. Particularly, in the ink set of the embodiment, it is preferable that the disperse dye in the yellow ink composition is the C.I. disperse yellow 54, the disperse dye in the magenta ink composition is the C.I. disperse red 60, and the disperse dye in the cyan ink composition is the C.I. disperse blue 359, from the viewpoint of color reproducibility.

In a case where the ink set of the embodiment contains the blue ink composition, it is preferable that the disperse dye in the blue ink composition is the C.I. disperse blue 72 or the C.I. disperse blue 28, from the viewpoint of color reproducibility.

The content of the disperse dye is preferably in a range of 0.5 mass % to 15.0 mass %, is further preferably in a range of 1.0 mass % to 7.0 mass %, and is still further preferably in a range of 2.0 mass % to 7.0 mass %, with respect to the total amount (100 mass %) of the respective ink compositions.

Water

Examples of water include water obtained by removing as many ionic impurities as possible, for example, pure water such as ion exchange water, ultra-filtration water, reverse osmosis water, and distilled water, and ultrapure water. In addition, when using water which is sterilized by adding ultraviolet irradiation or hydrogen peroxide, it is possible to prevent the occurrence of mold or bacteria in the case of long-term storage of the ink. With this, it is likely that the storage stability is improved.

The content of the water is preferably in a range of 50 mass % to 90 mass %, is further preferably in a range of 55 mass % to 85 mass %, and is further preferably in a range of 60 mass % to 80 mass %, with respect to the total amount (100 mass %) of the respective ink compositions. When the content of the water is in the above-described range, the viscosity of the ink composition can be more easily adjusted, and discharged ink compositions can be easily removed, and thus the productivity of the dyed products becomes more excellent.

Water-Soluble Organic Solvent

The water-soluble organic solvent is not particularly limited, and examples thereof include glycols such as ethylene glycol, diethylene glycol, triethylene glycol, polyethylene glycol, propylene glycol, dipropylene glycol, tripropylene glycol, polypropylene glycol, propanediol, butanediol, pentanediol, and hexylene glycol; lower alkyl ethers of glycol such as ethylene glycol monomethyl ether, diethylene glycol monomethyl ether, diethylene glycol monoethyl ether, diethylene glycol monobutyl ether, and triethylene glycol monomethyl ether; glycerine; 2-pyrrolidone; and N-methylpyrrolidone. Among these, it is preferable to include one or more types of the water-soluble organic solvent selected from the group consisting of glycerin and glycols. When the ink composition contains the water-soluble organic solvent, it is likely that intermittent properties are further improved. These water-soluble organic solvents can be used alone or two or more types thereof can be used in combination.

The content of the water-soluble organic solvent is preferably in a range of 5.0 mass % to 40 mass %, is further preferably in a range of 10 mass % to 30 mass %, and is still further preferably in a range of 15 mass % to 25 mass %, with respect to the total amount of ink composition (100 mass %). When the content of the water-soluble organic solvent is equal to or greater than 5.0 mass %, it is possible to suppress an increase in the viscosity of the ink composition due to water evaporation in the ink in the vicinity of the nozzles, and thus it is likely that the intermittent properties are further improved. In addition, when the content of the water-soluble organic solvent is equal to or less than 30 mass %, it is possible to more easily adjust the viscosity of the ink composition.

Dispersant

The ink composition may contain a dispersant. When the ink composition contains the dispersant, it is likely that the dispersion stability of the dye in the ink composition is further improved, and thus the storage stability of the ink composition, and the ejection stability over a long period are more excellent. The dispersant is not particularly limited, and examples thereof include an anionic dispersant, a nonionic dispersant, and a polymeric dispersant. The dispersant can be used alone or two or more types thereof can be used in combination.

The anionic dispersant is not particularly limited, and examples thereof include a formalin condensate of an aromatic sulfonic acid, a formalin condensate of a β-naphthalene sulfonic acid, a formalin condensate of an alkyl naphthalene sulfonic acid, and a formalin condensate of a creosote oil sulfonic acid.

The aromatic sulfonic acid is not particularly limited, and examples thereof include an alkyl naphthalene sulfonic acid such as a creosote oil sulfonic acid, a cresol sulfonic acid, a phenolsulfonic acid, a β-naphthol sulfonic acid, a methyl naphthalene sulfonic acid, and a butyl naphthalene sulfonic acid, a mixture of a β-naphthalene sulfonic acid and a β-naphthol sulfonic acid, a mixture of a cresol sulfonic acid and a 2-naphthol-6-sulfonic acid, and a lignin sulfonic acid.

The nonionic dispersant is not particularly limited, and examples thereof include an ethylene oxide adduct of phytosterol and an ethylene oxide adduct of cholestanol.

The polymer dispersant is not particularly limited, and examples thereof include polyacrylate partial alkyl ester, polyalkylene polyamine, polyacrylate, a styrene-acrylic acid copolymer, and a vinyl naphthalene-maleic acid copolymer.

The content of the dispersant is preferably in a range of 50 mass % to 200 mass %, is further preferably in a range of 75 mass % to 175 mass %, and is still further preferably in a range of 100 mass % to 150 mass %, with respect to the total amount (100 mass %) of disperse dye contained in the ink composition. When the content of the dispersant is in the above-described range, it is likely that dispersion stability of the dye is further improved.

Surfactant

The ink composition preferably includes the surfactant. With this, the printing stability becomes more excellent. The surfactant is not particularly limited, and examples thereof include an acetylene glycol surfactant, an anionic surfactant, and a silicone surfactant.

The acetylene glycol surfactant is not particularly limited, and examples thereof are preferably one or more types selected from the group consisting of alkylene oxide adducts of 2,4,7,9-tetramethyl-5-decyne-4,7-diol and 2,4,7,9-tetramethyl-5-decyne-4,7-diol, and alkylene oxide adducts of 2,4-dimethyl-5-decyne-4-ol and 2,4-dimethyl-5-decyne-4-ol. Commercially available products of the acetylene glycol surfactant are not particularly limited, and examples thereof include E series (manufactured by Air Products Japan, Inc., product name) such as OLFIN 104 series and Olefin E1010, and SURFYNOL 465 and SURFYNOL 61 (manufactured by Nissin Chemical Industry CO., Ltd., product name). The acetylene glycol surfactant may be used alone or two or more types thereof can be used in combination.

The anionic surfactant is not particularly limited, and examples thereof include alkylsulfocarboxylate, alkyl diphenyl ether disulfonates, α-olefin sulfonate, polyoxyethylene alkyl ether acetate, N-acylamino acid and salts thereof, N-acyl methyl taurine salt, alkyl sulfate polyoxy alkyl ether sulfates, alkyl sulfate polyoxyethylene alkyl ether phosphate, rosin acid soap, castor oil sulfate, lauryl alcohol sulfate, alkylphenol type phosphate ester, alkyl type phosphate ester, alkyl aryl sulfonates, diethyl sulfosuccinate, diethyl hexyl sulfosuccinate, and dioctyl sulfosuccinate. Commercially available products of the anionic surfactant are not particularly limited, and examples thereof include PELEX SS-H and PELEX SS-L (manufactured by Kao Corp.). The anionic surfactant may be used alone or two or more types thereof can be used in combination.

Examples of the silicone surfactant include a polysiloxane compound and polyether modified organosiloxane. Commercially available products of the silicone surfactant are not particularly limited, and examples thereof include BYK-306, BYK-307, BYK-333, BYK-341, BYK-345, BYK-346, BYK-347, BYK-348, BYK-349 (product names, manufactured by BYK Japan KK), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (product names, manufactured by Shin-Etsu Chemical Co., Ltd.). The silicone surfactant may be used alone or two or more types thereof can be used in combination.

The content of the surfactant is preferably in a range of 0.1 mass % to 2.0 mass %, is further preferably in a range of 0.5 mass % to 1.5 mass %, and is still further preferably in a range of 0.5 mass % to 1.0 mass %, with respect to the total amount (100 mass %) of the respective ink compositions. When the content of the surfactant is in the above-described range, it is likely that dispersion stability of the dye is further improved.

Since the ink composition allows the storage stability and the ejection stability from the head to be excellently maintained, allows ink clogging to be improved, or prevents the ink composition from being deteriorated, various types of additives, such as a dissolution aid, a viscosity modifier, a pH adjusting agent, an antioxidant, a preservative, a fungicide, a corrosion inhibitor, and a chelating agent for capturing metal ions which affect dispersion, can properly be added.

Method of Manufacturing Dyed Product

A method of manufacturing a dyed product of the embodiment includes, by using the ink jet method, a step of attaching at least the orange ink composition to the intermediate transfer medium, and a transfer step of transferring the specific disperse dye in the orange ink composition to the recording medium by heating the specific disperse dye in a state where a surface onto which the orange ink composition of the intermediate transfer medium is attached and a dyed surface of the recording medium face each other. FIGURE is a flow chart illustrating an example of steps included in a method of manufacturing a dyed product of the present embodiment.

Attaching Step

The attaching step is a step of attaching the orange ink composition onto the intermediate transfer medium, by using the ink jet method. The discharging of the ink composition with the ink jet method can be performed by using a well-known ink jet recording apparatus. As a discharging method, a piezo method and a method of discharging the ink composition due to bubbles which are generated by heating the ink composition can be used. Among them, the piezo method is preferably used from the viewpoint of difficulty of the deterioration of the ink composition.

The intermediate transfer medium is not particularly limited, and examples thereof include paper such as plan paper, or a recording medium (referred to as ink jet special paper, coated paper, or the like) in which an ink receiving layer is provided. Among them, it is preferable to use the paper in which an ink receiving layer is provided by using inorganic fine particles such as silica. With this, it is possible to obtain the intermediate transfer medium in which bleeding is suppressed in the step of drying the ink composition attached to the intermediate transfer medium, and it is likely that sublimation of the disperse dyes proceeds more smoothly in the subsequent transfer step.

Transfer Step

The transfer step is a step of transferring the specific disperse dye in the ink composition to the recording medium by heating the specific disperse dye in a state where a surface onto which the orange ink composition of the intermediate transfer medium is attached and a dyed surface of the recording medium face each other.

A heating temperature in the transferring step is not particularly limited, and the heating temperature is preferably in a range of 160° C. to 220° C., and is more preferably in a range of 170° C. to 200° C. When the heating temperature is set to be in the above range, it is likely that it is possible to more reduce the energy required for the transfer, and thus the productivity of the dyed products becomes more excellent. In addition, color developing properties of the obtained dyed product is further improved.

The heating time in this step is dependent on the heating temperature, and the heating time is preferably in a range of 30 seconds to 90 seconds, and further preferably in a range of 45 seconds to 60 seconds. When the heating time is in the above range, it is likely that it is possible to more reduce the energy required for the transfer, and the productivity of the dyed products becomes more excellent. In addition, color developing properties of the obtained dyed product is further improved.

In addition, this step can be performed by heating a surface of the intermediate transfer medium to which the ink composition is attached in a state of facing the recording medium with a certain gap interposed therebetween, and in a state where the intermediate transfer medium and the recording medium are attached to each other in a tight manner. Among these, the heating is performed in the state where the intermediate transfer medium and the recording medium are attached to each other in a tight manner. For this reason, it is likely that it is possible to more reduce the energy required for the transfer, and the productivity of the dyed products becomes more excellent. In addition, in this step, since the positional deviation of the recording medium and the intermediate transfer medium is less likely to occur, the dye is more accurately transferred from a desired position so as to obtain a dyed product, and thereby the color developing properties of the obtained dyed product is further improved.

The recording medium is not particularly limited, and, examples thereof include fabric (hydrophobic fiber fabric or the like), a resin (plastic) film, paper, glass, metal, and ceramics. In addition, as the recording medium, a sheet-like material or a material having a three-dimensional shape such as a spherical shape or a rectangular parallelepiped shape may be used.

In a case where the recording medium is the fabric, the fiber constituting the fabric is not particularly limited, and examples thereof include a polyester fiber, a nylon fiber, a triacetate fiber, a diacetate fiber, a polyamide fiber, and a blend product obtained by combining two or more of them. In addition, a blend product of recycled fibers such as the above fibers and rayon, and natural fibers such as cotton, silk and wool may be used.

In addition, in a case where the recording medium is a resin (plastic) film, a usable resin (plastic) film is not particularly limited; however, examples of the usable resin film include a polyester film, a polyurethane film, a polycarbonate film, a polyphenylene sulfide film, a polyimide film, and a polyamide-imide film. The resin (plastic) film may be a layered body which is formed of a plurality of layers are layered, and may be formed of a graded material of which the composition of the material is gradient-changed.

The method of manufacturing the dyed product of the embodiment may include other steps (pre-treatment step, intermediate treatment step, and post-treatment step) in addition to the above-described steps. The pre-treatment step is not particularly limited, and examples thereof include a step of washing the intermediate transfer medium before the attaching step. The intermediate treatment step is not particularly limited, and examples thereof include a step in which the recording medium is coated with a coating layer before the transfer step (coating step, refer to FIGURE), and a step of pre-heating the recording medium before the intermediate transfer step or the transfer step (pre-heating step, refer to FIGURE). The post-treatment step is not particularly limited, and examples thereof include a step of washing the recording medium after the transfer step (washing step, refer to FIGURE). In addition to the respective steps using the orange ink composition, the method of manufacturing the dyed product of the embodiment may include each step (that is, attaching step and transfer step, and optionally coating step, pre-heating step, and washing step) which is the same as described above, except that the orange ink composition is replaced with the ink composition having different colors. In this case, the above-described ink set of the embodiment may be used.

In addition, the ink composition of the embodiment is preferably used in the sublimation transfer for which the intermediate transfer medium is not used. The sublimation transfer for which the intermediate transfer medium is not used is not particularly limited, and examples thereof include a method of a step of attaching the orange ink composition of the embodiment to the ink receiving layer of the recording medium (film product and the like) which is provided with a detachable ink receiving layer by using the ink jet method, and a step of heating the recording medium which is provided with the ink receiving layer to which the orange ink composition is attached, and sublime-diffusion dyeing the recording medium of the lower side from the ink receiving layer by the orange ink composition, and a step of obtaining the dyed product by detaching the ink receiving layer from the recording medium. In addition to the respective steps using the above-described orange ink composition, the sublimation transfer may include each step which is the same as described above, except that the orange ink composition is replaced with the ink composition having different colors. In this case, the above-described ink set of the embodiment may be used.

Dyed Product

The dyed product of the embodiment is obtained by using the method of manufacturing the above-described dyed product. More specifically, the dyed product of the embodiment is obtained by the recording medium in the above-described manufacturing method being dyed by using at least the orange ink composition of the embodiment. The dyed product may be obtained by being dyed by the orange ink composition, and then additionally dyed by any one of ink compositions having other different colors. In this case, the dyed product may be dyed by using the above-described ink set.

EXAMPLES

Hereinafter, the invention will be specifically described by using Examples and Comparative Examples. The invention is not limited to the examples described below.

Material for Ink Composition

Main materials for the ink composition which are used in Examples and Comparative Examples below are as follows.

Dyes
  Specific Disperse Dye
  DO25: C.I. disperse orange 25
  DV28: C.I. disperse violet 28
  DB72: C.I. disperse blue 72
  DY54: C.I. disperse yellow 54
  DR60: C.I. disperse red 60
  DB359: C.I. disperse blue 359
Dispersant
  NS: a formalin condensate of a β-naphthalene sulfonic acid
Surfactant
  BYK 348: a silicone surfactant manufactured by BYK Japan KK
Water-Soluble Organic Solvent
  GL: glycerine
  TEGMME: triethylene glycol monomethyl ether Preparation of Ink Composition The respective materials were mixed in compositions indicated in Table 1 below, and were sufficiently stirred such that the respective sublimation transfer ink compositions and the ink set thereof can be obtained. Note that, in the below Table 1, a unit of numerical value is mass %, and a total value is 100.0 mass %.

Gas Generation Amount

The respective orange ink compositions in examples and comparative examples are subjected to a degassing treatment by using a vacuum pump, then are put into a sealed container so as not to come in contact with the outside air, and thereby the amount of the dissolved nitrogen gas was measured by using a GAS CHROMATOGRAPH ("6890 series", product name, manufactured by Agilent Technologies, Inc.). After that, the respective orange ink compositions were left to stand in a thermostatic tank of which a temperature is set to 60° C., and then the amount of the dissolved nitrogen gas of the respective orange ink compositions which were returned to a normal temperature after being left to stand was measured. The change amount of the dissolved nitrogen gas was evaluated based on evaluation criteria described below. The results obtained from Example 1 and Comparative Example 1 are indicated in Table 2.

A: change amount of dissolved nitrogen gas is equal to or less than 2 ppm

B: change amount of dissolved nitrogen gas is greater than 2 ppm

Color Reproducibility

An ink jet printer (PX-G930, manufactured by Seiko Epson Corporation) was filled with each of the ink sets in the examples and comparative examples. After that, the head of the printer was filled with the ink composition, and it was confirmed whether or not a normal recording operation can be performed without nozzle clogging. Then, a patch pattern for measuring volume of A4-size gamut was formed on a Transjet Sportline (manufactured by Cham Paper Group Switzerland Inc.) which is an intermediate transfer medium. Then, the side on which the ink composition of the intermediate transfer medium was attached was brought into close contact with a fabric which is a white recording medium (100% polyester, Amina, manufactured by Toray Industries, Inc.), in this state, heating was performed at 200° C. for 60 seconds using a heat press machine (TP-608M, manufactured by Taiyoseiki Co., Ltd.), and sublimation transfer was performed from the intermediate transfer medium to the recording medium, thereby obtaining the respective dyed products.

Each of the patch patterns of the obtained dyed products was measured at a viewing angle of 2° with a light source of D50 by using "Gretag Machbeth SPM50" (manufactured by Gretag Macbeth Corporation), and thereby L*a*b* which is specified in CIE was obtained. The gamut volume (=color reproducibility) was obtained from the value obtained as described above by assuming that the gamut volume is set to be 1 when the total number of the values of the L*a*b* specified in CIE is 1, and was evaluated based on evaluation criteria described below. The results are indicated in Table 3.

A: equal to or greater than 345,000
B: equal to or greater than 342,000 and less than 345,000
C: equal to or greater than 339,000 and less than 342,000
D: less than 339,000

The entire disclosure of Japanese Patent Application No. 2015-156414, filed Aug. 8, 2015 is expressly incorporated by reference herein.

TABLE 1

| | | Ink composition for sublimation transfer | | | | | | | | | | | |
|---|---|---|---|---|---|---|---|---|---|---|---|---|---|
| | | | Sublimation dye | | | | | | | | | Water-soluble | |
| | | | Specific | | | | | | | Dispersant | Surfactant | organic solvent | |
| | | water | dye | DO25 | DV28 | DB72 | DY54 | DR60 | DB359 | NS | BYK348 | GL | TEGMME |
| Orange ink | Or-1 | 69.2 | 6.0 | — | — | — | — | — | — | 6.0 | 0.8 | 15.0 | 3.0 |
| | Or-2 | 69.2 | — | 6.0 | — | — | — | — | — | 6.0 | 0.8 | 15.0 | 3.0 |
| Blue ink | Bl-1 | 73.2 | — | — | 4.0 | — | — | — | — | 4.0 | 0.8 | 15.0 | 3.0 |
| | Bl-2 | 73.2 | — | — | — | 4.0 | — | — | — | 4.0 | 0.8 | 15.0 | 3.0 |
| Yellow ink | Y-1 | 76.2 | — | — | — | — | 2.5 | — | — | 2.5 | 0.8 | 15.0 | 3.0 |
| Magenta ink | M-1 | 69.2 | — | — | — | — | — | 6.0 | — | 6.0 | 0.8 | 15.0 | 3.0 |
| Cyan ink | C-1 | 72.2 | — | — | — | — | — | — | 4.5 | 4.5 | 0.8 | 15.0 | 3.0 |
| Black ink | B-1 | 67.2 | — | — | — | — | 1.0 | 2.0 | 4.0 | 7.0 | 0.8 | 15.0 | 3.0 |

TABLE 2

| | Orange ink | Gas generation amount |
|---|---|---|
| Example 1 | Or-1 | A |
| Comparative Example 1 | Or-2 | B |

TABLE 3

| | Ink set | | | | | | Color reproduction area |
|---|---|---|---|---|---|---|---|
| | Orange ink | Blue ink | Yellow ink | Magenta ink | Cyan ink | Black ink | |
| Example 1 | Or-1 | Bl-1 | Y-1 | M-1 | C-1 | B-1 | A |
| Example 2 | Or-1 | Bl-2 | Y-1 | M-1 | C-1 | B-1 | B |
| Comparative Example 1 | — | — | Y-1 | M-1 | C-1 | B-1 | D |
| Comparative Example 2 | Or-2 | Bl-2 | Y-1 | M-1 | C-1 | B-1 | C |

What is claimed is:

1. An ink set comprising:
    an orange ink composition, comprising a compound expressed by the following Formula (1):

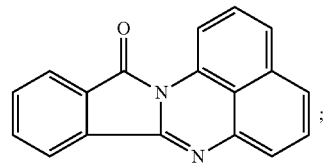

(1)

a yellow ink composition;
a magenta ink composition; and
a cyan ink composition,
wherein the yellow ink composition, the magenta ink composition, and the cyan ink composition each independently contain a disperse dye.

2. The ink set according to claim 1,
wherein the orange ink composition contains the compound expressed by Formula (1) in a range of 1.0 mass % to 7.0 mass %, with respect to the total amount of the orange ink composition.

3. The ink set according to claim 1, further comprising a blue ink composition containing a disperse dye.

4. The ink set according to claim 1,
wherein the disperse dye in the yellow ink composition is a C.I. disperse yellow 54,
wherein the disperse dye in the magenta ink composition is a C.I. disperse red 60, and
wherein the disperse dye in the cyan ink composition is a C.I. disperse blue 359.

5. The ink set according to claim 1,
wherein the disperse dye in the blue ink composition is a C.I. disperse blue 72, or a C.I. disperse violet 28.

6. A method of manufacturing a dyed product, comprising:
    attaching at least the orange ink composition of the ink set according to claim 1, to an intermediate transfer medium by using an ink jet method; and
    transferring a compound expressed by the following Formula (1):

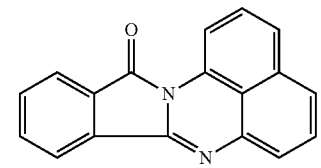

(1)

in the orange ink composition to a recording medium by heating the orange ink composition in a state where a surface of the intermediate transfer medium onto which the orange ink composition is attached and a dyed surface of the recording medium face each other.

7. A method of manufacturing a dyed product, comprising:

attaching at least the orange ink composition of the ink set according to claim 2, to an intermediate transfer medium by using an ink jet method; and transferring a compound expressed by the following Formula (1)

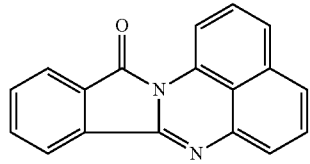

(1)

in the orange ink composition to a recording medium by heating the orange ink composition in a state where a surface of the intermediate transfer medium onto which the orange ink composition is attached and a dyed surface of the recording medium face each other.

8. A dyed product is obtained by using the method of manufacturing a dyed product according to claim 6.

9. A dyed product is obtained by using the method of manufacturing a dyed product according to claim 7.

* * * * *